United States Patent
Taki et al.

(10) Patent No.: US 12,142,062 B2
(45) Date of Patent: Nov. 12, 2024

(54) READING SYSTEM, READING METHOD, STORAGE MEDIUM, AND MOVING BODY

(71) Applicant: KABUSHIKI KAISHA TOSHIBA, Tokyo (JP)

(72) Inventors: Toshikazu Taki, Yokohama (JP); Tsubasa Kusaka, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 283 days.

(21) Appl. No.: 17/197,272

(22) Filed: Mar. 10, 2021

(65) Prior Publication Data
US 2021/0192255 A1    Jun. 24, 2021

Related U.S. Application Data

(63) Continuation of application No. PCT/JP2019/037257, filed on Sep. 24, 2019.

(30) Foreign Application Priority Data

Nov. 16, 2018  (JP) ................. 2018-216046

(51) Int. Cl.
*G06V 20/62* (2022.01)
*G06V 30/10* (2022.01)
(Continued)

(52) U.S. Cl.
CPC ............ *G06V 20/62* (2022.01); *G06V 30/168* (2022.01); *G06V 30/18086* (2022.01); *G06V 30/18105* (2022.01); *G06V 30/10* (2022.01)

(58) Field of Classification Search
None
See application file for complete search history.

(56) References Cited

U.S. PATENT DOCUMENTS

| 5,199,084 A * | 3/1993 | Kishi | G06K 7/10861 |
| | | | 382/292 |
| 6,470,336 B1 * | 10/2002 | Matsukawa | G06F 16/93 |
| | | | 382/229 |

(Continued)

FOREIGN PATENT DOCUMENTS

| JP | 61-48079 A | 3/1986 |
| JP | 4-135287 A | 5/1992 |

(Continued)

OTHER PUBLICATIONS

Shenoy, Varun N., and Oliver O. Aalami. "Utilizing smartphone-based machine learning in medical monitor data collection: seven segment digit recognition." AMIA Annual Symposium Proceedings. vol. 2017. American Medical Informatics Association, 2017. (Year: 2017).*

(Continued)

*Primary Examiner* — Michelle M Entezari Hausmann
(74) *Attorney, Agent, or Firm* — Oblon, McClelland, Maier & Neustadt, L.L.P.

(57) ABSTRACT

According to one embodiment, a reading system includes a processing device. The processing device includes an extractor, a line thinner, a setter, and an identifier. The extractor extracts a partial image from an input image. A character of a segment display is imaged in the partial image. The segment display includes a plurality of segments. The line thinner thins a cluster of pixels representing a character in the partial image. The setter sets, in the partial image, a plurality of determination regions corresponding respectively to the plurality of segments. The identifier detects a number of pixels included in the thinned cluster for each of the plurality of determination regions, and identifies the character based on a detection result.

25 Claims, 13 Drawing Sheets

(51) Int. Cl.
*G06V 30/168* (2022.01)
*G06V 30/18* (2022.01)

(56) References Cited

U.S. PATENT DOCUMENTS

| | | | | |
|---|---|---|---|---|
| 8,755,595 | B1* | 6/2014 | Bissacco | G06F 18/214 |
| | | | | 382/159 |
| 11,430,236 | B1* | 8/2022 | Holmsten | G06V 30/19147 |
| 2002/0181777 | A1* | 12/2002 | Sumikawa | G06V 30/1444 |
| | | | | 382/202 |
| 2005/0151849 | A1* | 7/2005 | Fitzhugh | G04G 5/00 |
| | | | | 348/207.99 |
| 2007/0172128 | A1* | 7/2007 | Hirao | G06T 7/12 |
| | | | | 382/260 |
| 2007/0291987 | A1* | 12/2007 | Saka | G06V 20/58 |
| | | | | 382/103 |
| 2011/0258195 | A1* | 10/2011 | Welling | G06V 30/262 |
| | | | | 707/E17.09 |
| 2012/0224765 | A1* | 9/2012 | Kim | G06V 20/62 |
| | | | | 382/176 |
| 2013/0108160 | A1* | 5/2013 | Yamazoe | G06V 30/268 |
| | | | | 382/177 |
| 2013/0177247 | A1* | 7/2013 | Yoon | G06V 30/158 |
| | | | | 382/187 |
| 2015/0039637 | A1* | 2/2015 | Neuhauser | G06V 20/62 |
| | | | | 707/758 |
| 2015/0181077 | A1* | 6/2015 | Misawa | H04N 1/40062 |
| | | | | 358/2.99 |
| 2015/0317530 | A1* | 11/2015 | Aizawa | G06V 20/635 |
| | | | | 382/182 |
| 2016/0224851 | A1* | 8/2016 | Yesugade | G06V 20/582 |
| 2016/0275378 | A1 | 9/2016 | Hayashi | |
| 2016/0300116 | A1 | 10/2016 | Yasunaga et al. | |
| 2016/0371557 | A1 | 12/2016 | Takahashi | |
| 2017/0140234 | A1 | 5/2017 | Yasunaga et al. | |
| 2018/0315065 | A1* | 11/2018 | Zhang | G06Q 30/0206 |
| 2019/0073543 | A1* | 3/2019 | Ichinose | G06V 10/75 |

FOREIGN PATENT DOCUMENTS

| | | |
|---|---|---|
| JP | 2000-339472 A | 12/2000 |
| JP | 2001-349789 A | 12/2001 |
| JP | 2008-243103 A | 10/2008 |
| JP | 2015-197851 A | 11/2015 |
| JP | 2016-147600 A | 8/2016 |
| JP | 2016-177655 A | 10/2016 |
| JP | 2016-201094 A | 12/2016 |
| JP | 2017-10170 A | 1/2017 |
| JP | 2019-144703 A | 8/2019 |
| JP | 2019-144704 A | 8/2019 |

OTHER PUBLICATIONS

Kanagarathinam, Karthick, and Kavaskar Sekar. "Text detection and recognition in raw image dataset of seven segment digital energy meter display." Energy Reports 5 (2019): 842-852. (Year: 2019).*

Savolainen, Tuomas, Daniel Keith Whiter, and Noora Partamies. "Automatic segmentation and classification of seven-segment display digits on auroral images." Geoscientific Instrumentation, Methods and Data Systems 5.2 (2016): 305-314. (Year: 2016).*

International Search Report issued Dec. 17, 2019 in PCT/JP2019/037257 filed Sep. 24, 2019, 2 pages.

* cited by examiner

| DETERMINATION RESULT | NUMERAL |
|---|---|
| 1111101 | 0 |
| 0000111 | 1 |
| 0110111 | 2 |
| 0101111 | 3 |
| 1101010 | 4 |
| 1001111 | 5 |
| 1011111 | 6 |
| 0101100 | 7 |
| 1111111 | 8 |
| 1101111 | 9 |

READING SYSTEM, READING METHOD, STORAGE MEDIUM, AND MOVING BODY

CROSS-REFERENCE TO RELATED APPLICATIONS

This is a continuation application of International Application PCT/JP2019/037257, filed on Sep. 24, 2019. This application also claims priority to Japanese Patent Application No. 2018-216046, filed on Nov. 16, 2018. The entire contents of each are incorporated herein by reference.

FIELD

Embodiments described herein relate generally to a reading system, a reading method, a storage medium, and a moving body.

BACKGROUND

There is a system that reads a character (e.g., a numeral) displayed in a segment display. It is desirable for the system to have high accuracy of reading the character.

BRIEF DESCRIPTION OF THE DRAWINGS

FIG. 4 is a table illustrating the correspondence between the numerals and the combinations of the determination results;

DETAILED DESCRIPTION

Figure 1:
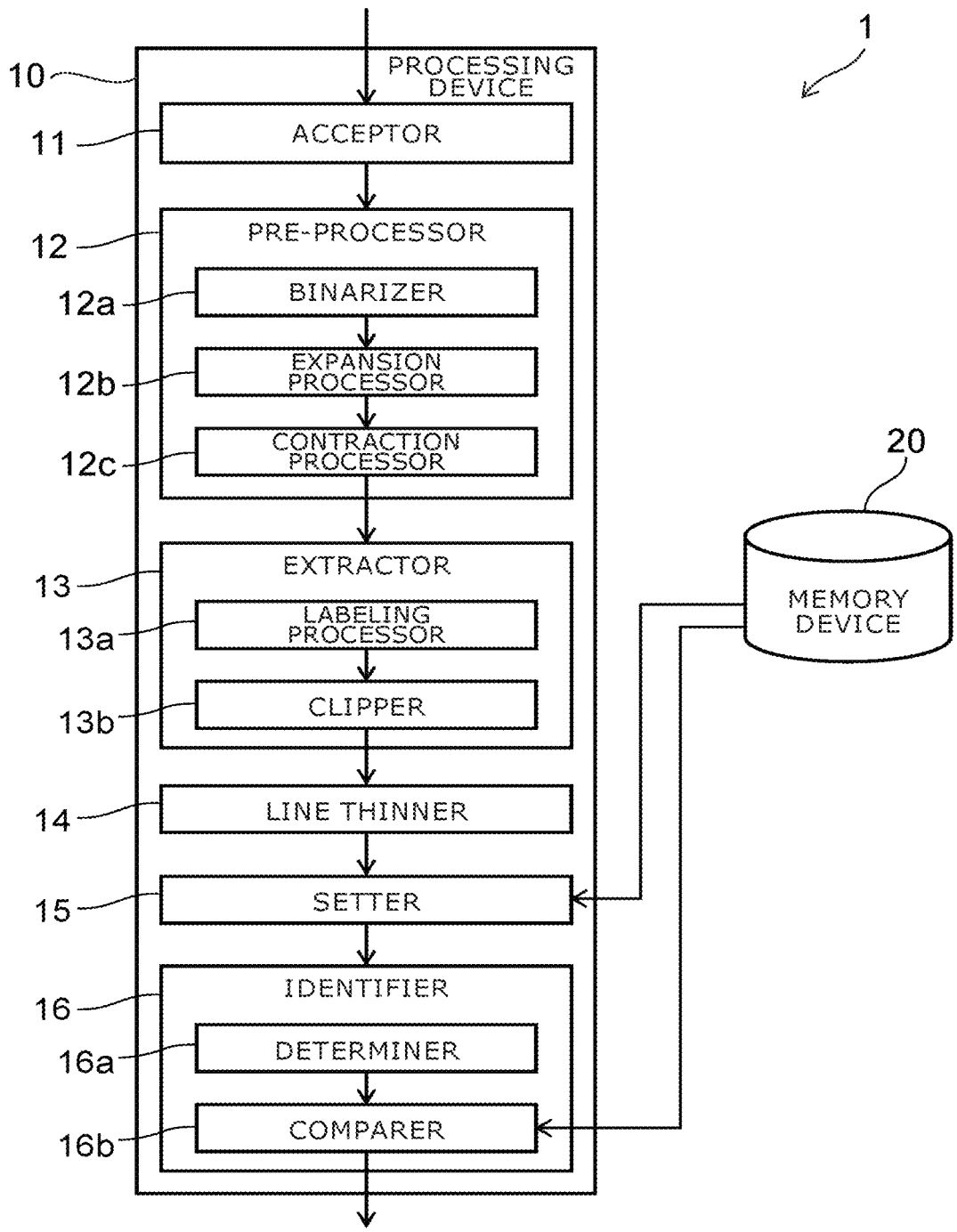
FIG. 1 is a block diagram illustrating a configuration of a reading system according to a first embodiment.

According to one embodiment, a reading system includes a processing device. The processing device includes an extractor, a line thinner, a setter, and an identifier. The extractor extracts a partial image from an input image. A character of a segment display is imaged in the partial image. The segment display includes a plurality of segments. The line thinner thins a cluster of pixels representing a character in the partial image. The setter sets, in the partial image, a plurality of determination regions corresponding respectively to the plurality of segments. The identifier detects a number of pixels included in the thinned cluster for each of the plurality of determination regions, and identifies the character based on a detection result.

Various embodiments are described below with reference to the accompanying drawings. In the specification and drawings, components similar to those described previously in an antecedent drawing are marked with like reference numerals, and a detailed description is omitted as appropriate.

First Embodiment

FIG. 1 is a block diagram illustrating a configuration of a reading system according to a first embodiment.

The reading system according to the embodiment is used to read a character displayed in a segment display from an image in which the segment display is imaged. In the segment display, one character is displayed by multiple segments. The character is displayed by at least a portion of the multiple segments emitting light and by the remaining segments being unlit. The reading system according to the embodiment identifies the character from the image.

The number of segments included in the segment display to be read is arbitrary. For example, the segment display to be read may be a so-called seven-segment display in which one character is displayed by seven segments. The seven-segment display displays a character (a numeral) representing a number. A fourteen-segment display or a sixteen-segment display that displays an alphabet character may be the reading object. In the description herein, mainly, the reading system according to the embodiment reads a numeral displayed in a seven-segment display.

As illustrated in FIG. 1, the reading system 1 according to the first embodiment includes a processing device 10 and a memory device 20. The processing device 10 includes, for example, an acceptor 11, a pre-processor 12, an extractor 13, a line thinner 14, a setter 15, and an identifier 16.

FIGS. 2A to 2D, 3A, 3B, and 5A to 5E illustrate processing according to the reading system according to the first embodiment.

FIG. 4 is a table illustrating the correspondence between the numerals and the combinations of the determination results.

The processing according to the reading system according to the first embodiment will now be described with reference to FIGS. 2A to 5E.

An image in which a segment display is imaged is input to the processing device 10. The acceptor 11 accepts the input image. For example, an external imaging device generates the image by imaging the segment display. The imaging device transmits the image to the processing device 10. Or, the image may be transmitted from an external memory device to the processing device 10. The acceptor 11 accepts the image transmitted to the processing device 10. An object other than a segment display may be imaged in the image. Herein, the image that is accepted by the acceptor 11 is called the input image.

Figure 2A:
FIGS. 2A to 2D illustrate processing according to the reading system according to the first embodiment.

FIG. 2A is an example of an input image A transmitted to the processing device 10. In the example of FIG. 2A, multiple numerals are displayed by the segment display. Each of the numerals is displayed by multiple segments.

The pre-processor 12 applies preprocessing to the input image before identifying the numeral displayed by the segment display. The accuracy of the identification of the numeral can be increased by the preprocessing. For example, the pre-processor 12 includes a binarizer 12*a*, an expansion processor 12*b*, and a contraction processor 12*c*.

The binarizer 12*a* binarizes the input image. The binarized input image is illustrated using two mutually-different colors (a first color and a second color). Here, a case will be described where the first color is white and the second color is black.

For example, the background of the segment display is a dark color. The segments that emit light are brighter than the background. Therefore, in the binarized input image, the segments that emit light are illustrated using white. The unlit segments and the background are illustrated using black. In other words, in the binarized input image, the numeral is shown by the white pixels.

Or, in a segment display in which a liquid crystal display is used, the character is illustrated using a color that is darker than the background. In such a case, inversion of the colors of the pixels is performed for the binarized input image. By inverting, the numeral is shown by the white pixels similarly to the case described above. Hereinafter, a case will be described where the segments that emit light are illustrated using white, and the background and the unlit segments are illustrated using black.

For example, the input image is digitized into data as an RGB color model shown using the three primary colors of red (Red), green (Green), and blue (Blue). In the binary processing, first, the input image is converted into data in HSV color space defined by the three components of hue (Hue), color saturation (Saturation), and luminance (Value). Then, a histogram analysis of the data in HSV color space is performed. Continuing, a threshold is calculated based on the histogram of the pixels. The pixels are binarized into white and black based on the threshold and the histogram of the pixels.

The expansion processor 12*b* expands the white pixels in the binary image. For example, the expansion processor 12*b* modifies the pixels adjacent to the white pixels to be white. Adjacent pixels that are white originally are not modified. For example, there are cases where black pixels are interspersed in portions where white pixels are clustered due to the effects of noise, etc. The expansion processing modifies the interspersed black pixels to be white pixels. Thereby, the effects of noise, etc., can be reduced, and the reading accuracy of the numeral can be increased. The expansion processing can connect clusters of proximate white pixels to each other. By connecting clusters of proximate white pixels to each other, one cluster of pixels that corresponds to one numeral is generated. The extraction of the partial image described below is made easy thereby.

The contraction processor 12*c* contracts the white pixels in the binary image. For example, the contraction processor 12*c* modifies pixels adjacent to black pixels to be black. Adjacent pixels that are black originally are not modified. The contraction processing reduces the number of expanded white pixels.

Figure 2B:

FIG. 2B is an example of the input image A on which the preprocessing (the binarization, the expansion processing, and the contraction processing) has been performed. As illustrated in FIG. 2B, clusters of white pixels corresponding to the numerals are generated by such preprocessing.

The pre-processor 12 may perform the expansion processing and the contraction processing described above multiple times. For example, the pre-processor 12 may perform the contraction processing two or more times after performing the expansion processing two or more times. The pre-processor 12 may perform the expansion processing two or more times after performing the contraction processing two or more times. For example, the implementation count of the expansion processing and the implementation count of the contraction processing may be set to be the same. Or, the implementation count of the expansion processing may be different from the implementation count of the contraction processing. For example, the implementation count of the expansion processing may be set to be more than the implementation count of the contraction processing.

The pre-processor 12 may perform a processing set including one expansion processing and one contraction processing multiple times. In one processing set, one of the expansion processing or the contraction processing is performed after the other is performed. The sequence of the expansion processing and the contraction processing in one processing set may be different from the sequence of the expansion processing and the contraction processing in another processing set.

The pre-processor 12 also may perform other processing. For example, when an object other than a segment display is included in the input image, the pre-processor 12 may cut out, from the input image, the portion in which the segment display is imaged. If the input image is distorted, the pre-processor 12 may perform a correction of the distortion.

The pre-processor 12 outputs the processed input image to the extractor 13. The extractor 13 extracts a partial image from the input image. The partial image is a portion of the input image in which a numeral of the segment display is imaged.

For example, the extractor 13 includes a labeling processor 13*a* and a clipper 13*b*. The binarized input image is output from the pre-processor 12 to the extractor 13. The labeling processor 13*a* assigns a label (a value) to the cluster of white pixels. The "cluster of white pixels" refers to a portion in which white pixels are adjacent to each other and form one white clump. In the cluster of white pixels, one white pixel is adjacent to at least one white pixel. One cluster of white pixels corresponds to one numeral displayed by the segment display. When multiple clusters of white pixels exist, the labeling processor 13*a* assigns a label to each cluster of white pixels.

The clipper 13*b* cuts out the portion including the labeled cluster from the input image. The cut-out portion is used as the partial image. When multiple labeled clusters exist, the clipper 13*b* cuts out multiple partial images. The multiple partial images respectively include the multiple labeled clusters. For example, the partial image is rectangular. The partial image includes multiple pixels arranged in a first direction and in a second direction crossing the first direction. For example, the partial image is cut out so that the surface area (the number of pixels) is a minimum and each side contacts an outer edge of the cluster.

Figure 2C:
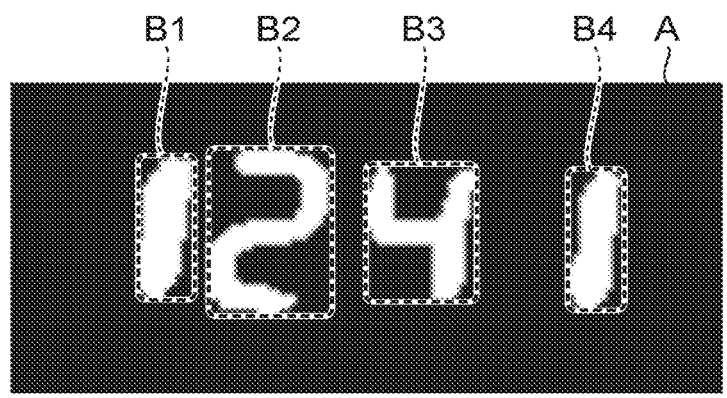

FIG. 2C illustrates the input image A and partial images B1 to B4 cut out by the clipper 13*b*. Each side of the partial images B1 to B4 contacts an outer edge of the cluster of white pixels. Therefore, the sizes of the partial images are different according to the sizes of the clusters.

The extractor 13 outputs the extracted (cut-out) partial image to the line thinner 14. The line thinner 14 performs line thinning of the partial image. Namely, the line thinner 14 processes the cluster of white pixels included in the partial image to cause the line width to be one pixel.

Figure 2D:
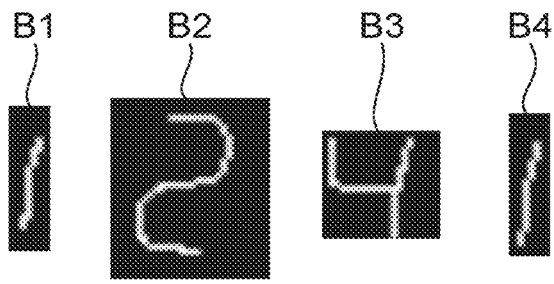

FIG. 2D illustrates the results of thinning the partial images B1 to B4 illustrated in FIG. 2C. In the state of FIG. 2C, the sides of the partial images contact the outer edges of the clusters of white pixels. Performing the thinning causes the sides of the partial images B1 to B4 to separate from the clusters of white pixels.

The line thinner 14 may thin the lines of the binary image output from the pre-processor 12. For example, the clipper 13b stores the position where the partial image is to be cut out. The line thinner 14 outputs the thinned binary image to the extractor 13. The clipper 13b cuts out a portion of the thinned binary image at the stored cut-out position. The thinned partial image illustrated in FIG. 2D is obtained thereby.

The setter 15 sets multiple determination regions in the thinned partial image. It is sufficient for the number of determination regions that are set to be not less than the number of segments used to display one character. For example, the number of determination regions that are set is equal to the number of segments used to display one numeral. For example, seven determination regions are set in one partial image when a numeral displayed by a seven-segment display is read. The positions of the determination regions are determined based on the size of the extracted partial image. For example, the memory device 20 stores information relating to the set positions of the determination regions. The setter 15 determines the positions of the determination regions based on the information stored in the memory device 20 and the size of the partial image.

Figure 3A:
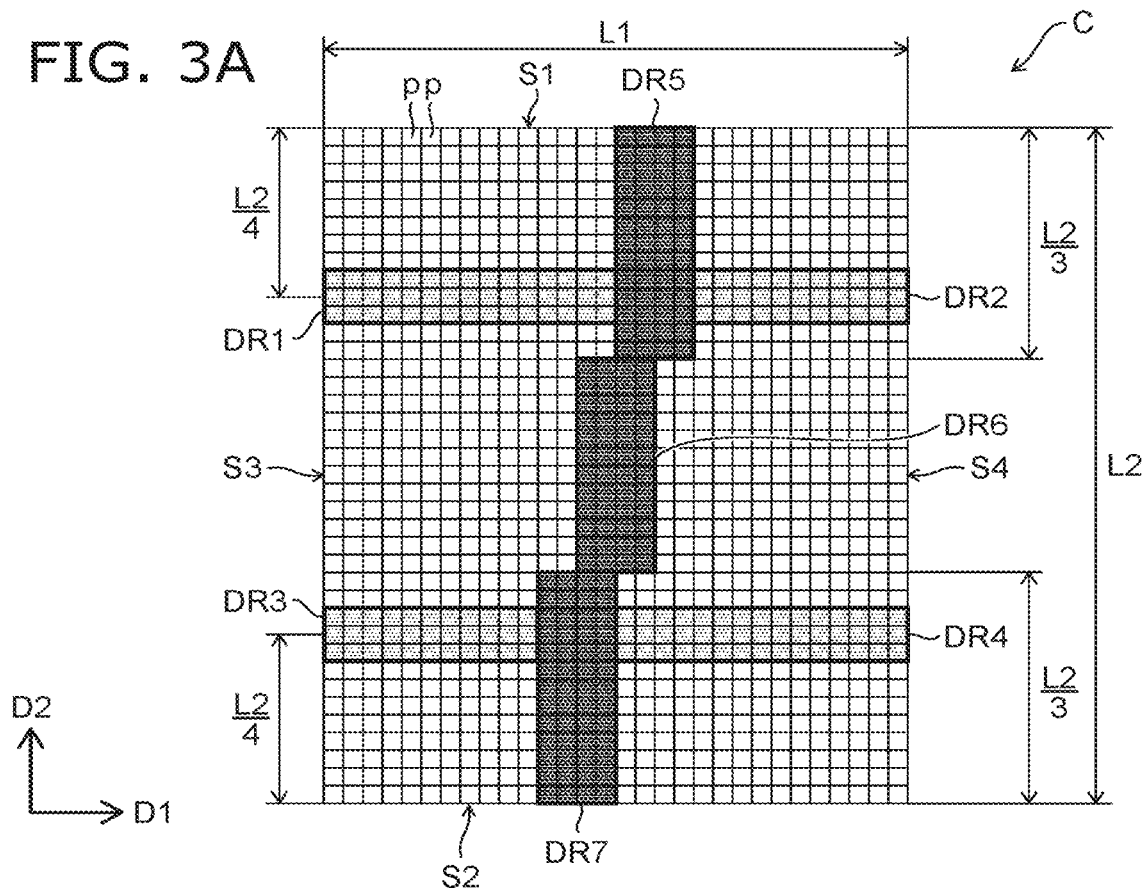
FIGS. 3A and 3B illustrate processing according to the reading system according to the first embodiment.

FIG. 3A is a schematic view for describing the method for setting the determination regions. A partial image C illustrated in FIG. 3A includes multiple pixels P. Determination regions DR1 to DR7 are set in the partial image C. The determination regions DR1 and DR2 are arranged along a first direction D1. The determination regions DR3 and DR4 are arranged along the first direction D1. The determination regions DR1 and DR2 are separated from the determination regions DR3 and DR4 in a second direction D2. The determination regions DR5 to DR7 are arranged along the second direction D2.

As in the determination regions DR5 to DR7 illustrated in FIG. 3A, the arrangement direction of a portion of the determination regions may not be parallel to the second direction D2 and may be tilted with respect to the second direction D2. For example, the angle between the second direction D2 and the arrangement direction of a portion of the determination regions is set to be greater than 0 degrees and not more than 20 degrees. Similarly, the arrangement direction of another portion of the determination regions may be tilted with respect to the first direction D1. For example, the angle between the first direction D1 and the arrangement direction of the other portion of the determination regions is set to be greater than 0 degrees and not more than 20 degrees. Such an arrangement also is included in the case where the multiple determination regions are arranged along the first direction D1 or the second direction D2.

The length (the number of pixels) in the first direction D1 of the partial image C illustrated in FIG. 3A is taken as L1. The length in the second direction D2 of the partial image B is taken as L2. The partial image C includes first to fourth sides S1 to S4. The first side S1 and the second side S2 are parallel to the first direction D1. The third side S3 and the fourth side S4 are parallel to the second direction D2.

For example, the setting of the determination regions DR1 and DR2 is referenced to a position separated L2/4 from the first side S1. For example, the setting of the determination regions DR3 and DR4 is referenced to a position separated L2/4 from the second side S2. For example, the setting of the determination regions DR5 to DR7 is referenced to the middle positions of the third and fourth sides S3 and S4. For example, the determination regions DR5 and DR7 are set to positions shifted in the first direction D1 from the middle positions. For example, the length in the second direction D2 is set to L2/3 for each of the determination regions DR5 to DR7. Information that relates to the positions used as these references are stored in, for example, the memory device 20. Each determination region is set so that the determination region does not overlap the other determination regions. Each determination region includes the pixel P at the position used as the reference, and the pixels P at the periphery of the pixel P. For example, the sizes of the determination regions are set according to the size of the partial image C.

The positions that are used as the references for setting the determination regions for the size of the partial image and the sizes of the determination regions for the size of the partial image are modifiable as appropriate according to the segment display to be read, the characteristics of the input image, etc.

Thus, the positions of the multiple determination regions are determined based on the size (the length in the first direction and the length in the second direction) of the partial image. The setter 15 outputs the determination regions that are set to the identifier 16.

The identifier 16 identifies the numeral based on the number of pixels included in the thinned numeral in each determination region. For example, the identifier 16 includes a determiner 16a and a comparer 16b.

The determiner 16a detects the number of pixels included in the thinned cluster in each determination region. When the segments that emit light are illustrated using white, the determiner 16a detects the number of white pixels in each determination region. The determiner 16a compares the detected number of pixels to a preset threshold and determines whether or not a portion of the numeral exists in each determination region. Specifically, the determiner 16a determines that a portion of the numeral exists in the determination region if the detected number of pixels is not less than the threshold. For example, the threshold is set to 1.

For example, the determiner 16a represents the determination result as "0" or "1" in each determination region. "0" indicates that a portion of the numeral does not exist in the determination region. "1" indicates that a portion of the numeral exists in the determination region.

Figure 3B:
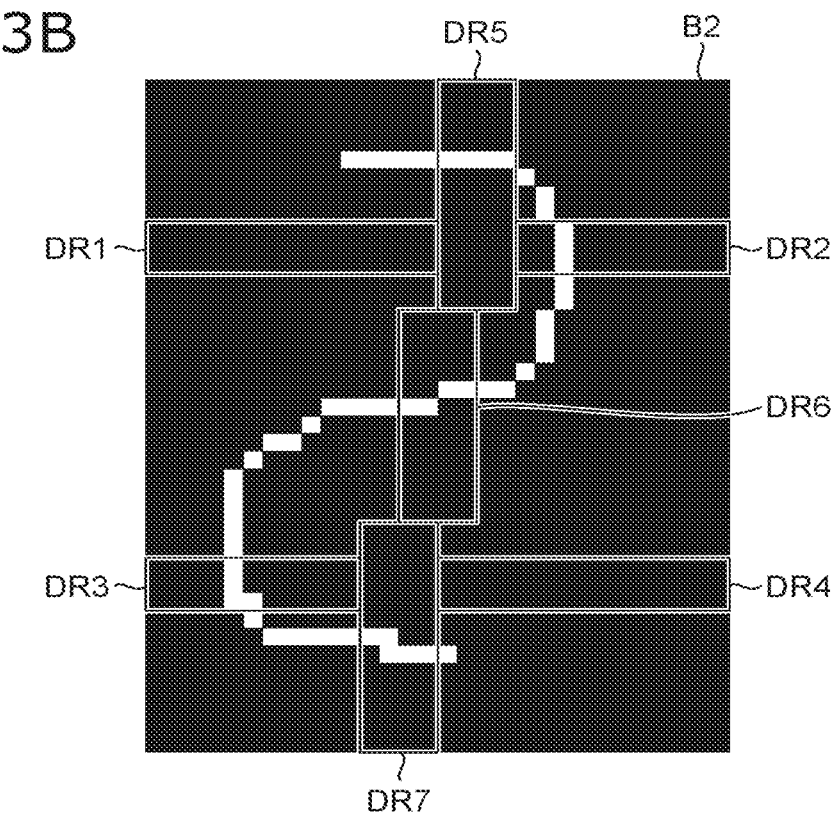
Figure 5A:
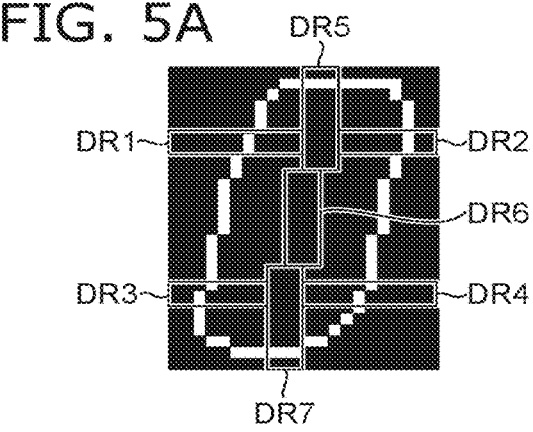
FIGS. 5A to 5E illustrate processing according to the reading system according to the first embodiment.
Figure 5D:
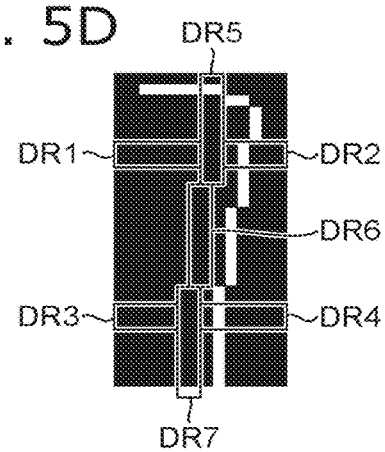
Figure 5B:
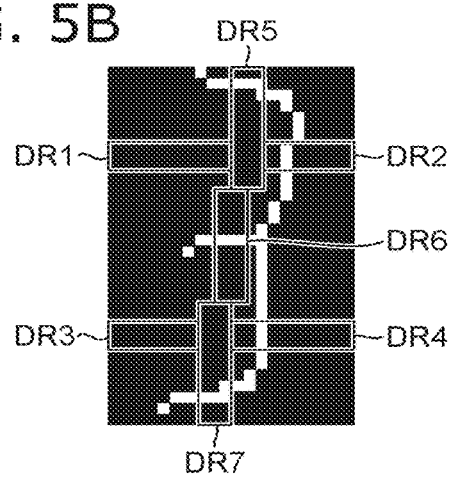
Figure 5E:
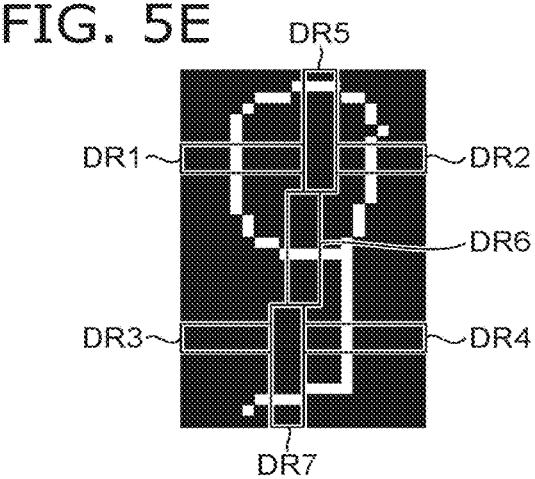
Figure 5C:
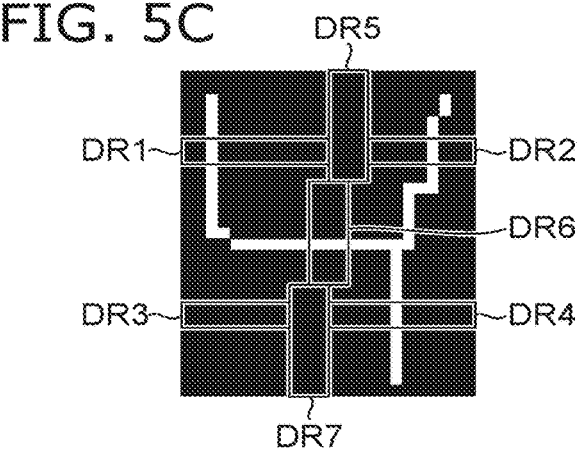

FIG. 3B is one of the multiple partial images illustrated in FIG. 2D. As illustrated in FIG. 3B, the determination regions DR1 to DR7 are set based on the size of the partial image B2. In the example of FIG. 3B, portions of the numeral are determined to exist in the determination regions DR2, DR3, and DR5 to DR7. For example, this result is represented as "0110111" using 0 and 1.

The comparer 16b refers to the memory device 20. The correspondences between the numerals and the combinations of the determination results of each determination region are prestored in the memory device 20. FIG. 4 illustrates a table in which the correspondences are stored. The comparer 16b searches for a combination in the combinations of the determination results stored in the memory device 20 that matches the combination of the determination results of the determiner 16a. The comparer 16b identifies, as the numeral shown in the partial image, the numeral that corresponds to the matching combination of the determination results.

For example, in the example of FIG. 3B, the combination of the determination results is represented by "0110111". The comparer 16b searches for a combination that matches this combination. As a result of the search, the combination of the determination results of the determiner 16a matches the combination of the determination results corresponding to the numeral "2". Thereby, the comparer 16*b* identifies that the numeral shown in the partial image is "2".

The form of the combination of the determination results is modifiable as appropriate as long as the combination of the determination results and the searched combinations are arranged according to the same rules.

FIGS. 5A to 5E illustrate partial images showing other numerals and setting examples of the determination regions of the partial images. As illustrated in FIGS. 5A to 5E, the positions and the sizes of the set regions are set according to the sizes of the partial images.

When multiple partial images are extracted by the extractor 13, the setter 15 and the identifier 16 identify the set determination regions and identify the numerals for each of the partial images. The identifier 16 outputs the identified numerals.

For example, the processing device 10 outputs, to the external output device, information based on the numeral that is read. For example, the information includes the numeral that is read. The information may include a result calculated based on the numeral that is read. The processing device 10 may calculate another numeral based on multiple numerals that are read and may output the calculation result. The processing device 10 also may output information such as the time of the reading, etc. Or, the processing device 10 may output a file including the information such as the numeral that is read, the time of the reading, etc., in a prescribed format such as CSV, etc. The processing device 10 may transmit the data to an external server by using FTP (File Transfer Protocol), etc. Or, the processing device 10 may insert the data into an external database server by performing database communication and using ODBC (Open Database Connectivity), etc.

The processing device 10 includes, for example, a processing circuit made of a central processing unit. The memory device 20 includes, for example, at least one of a hard disk drive (HDD), a network-attached hard disk (NAS), an embedded multimedia card (eMMC), a solid-state drive (SSD), or a solid-state hybrid drive (SSHD). The processing device 10 and the memory device 20 are connected by a wired or wireless technique. Or, the processing device 10 and the memory device 20 may be connected to each other via a network.

Figure 6:
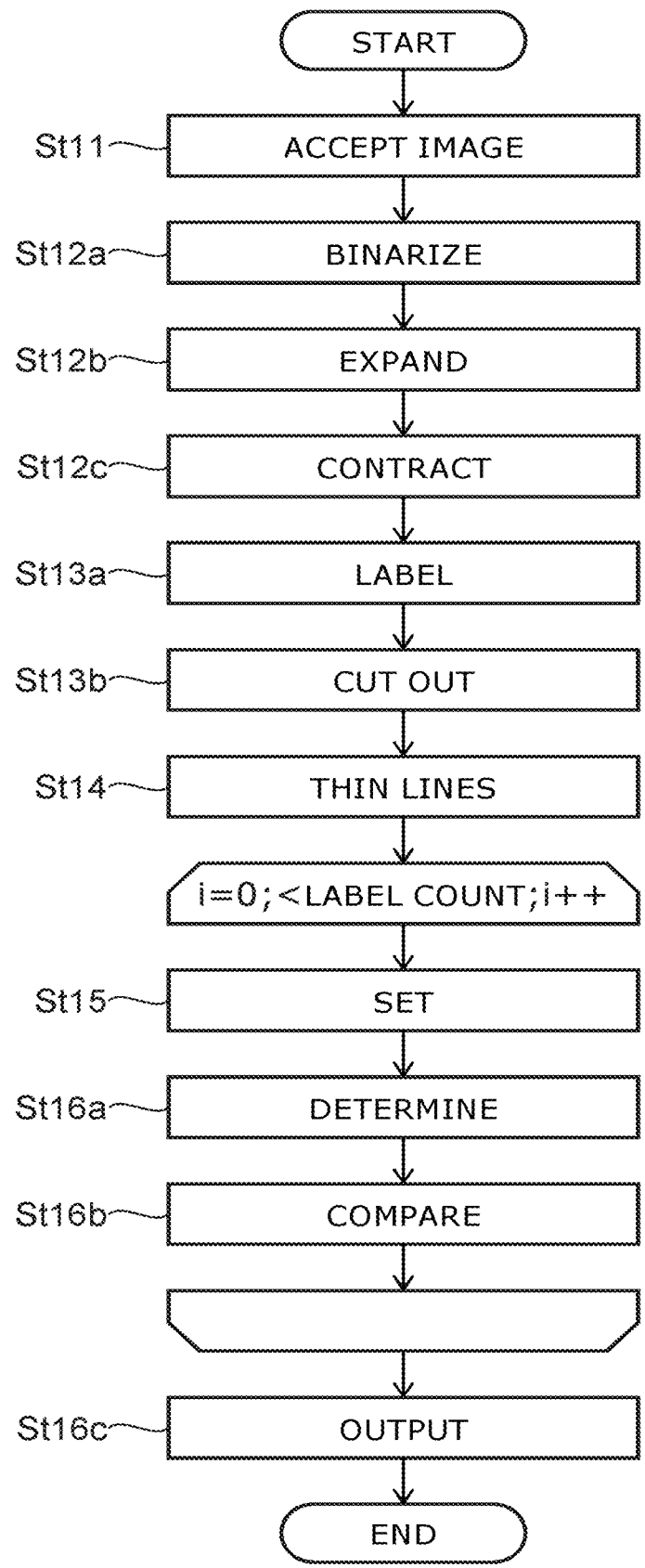
FIG. 6 is a flowchart illustrating processing according to the reading system 1 according to the first embodiment.

FIG. 6 is a flowchart illustrating processing according to the reading system 1 according to the first embodiment.

The acceptor 11 accepts an input image transmitted to the processing device 10 (step St11). The binarizer 12*a* binarizes the input image (step St12*a*). The expansion processor 12*b* performs expansion processing of the binarized input image (step St12*b*). The contraction processor 12*c* performs contraction processing of the binarized and expanded input image (step St12*c*). The labeling processor 13*a* assigns a label to the cluster of white pixels included in the input image (step St13*a*). The clipper 13*b* cuts out, from the input image, the partial image including the labeled cluster of white pixels (step St13*b*). The line thinner 14 thins the cluster of white pixels in the input image or the partial image (step St14). The setter 15 sets multiple determination regions in one partial image (step St15). The determiner 16*a* detects the number of pixels included in the thinned cluster in each determination region. The determiner 16*a* determines whether or not a portion of a numeral exists in each determination region based on the number (step St16*a*). The comparer 16*b* compares the combination of the determination results of the determiner 16*a* to a preregistered table (step St16*b*). The comparer 16*b* sets the numeral included in the partial image to be the numeral corresponding to the combination of the determination results of the determiner 16*a*.

Steps St15 to St16*b* are repeated until i is equal to the label count. In other words, initially, i is set to 0.1 is added to i when the identification of the numeral is completed for one cluster of white pixels. Steps St15 to St16*b* are repeated while i is less than the label count. Accordingly, when multiple labeled clusters of white pixels exist, the identification of the numeral is performed for each of the clusters. When the identification of the numeral is completed for all of the clusters, the numerals are output (step St16*c*).

Effects of the first embodiment will now be described with reference to a reading method according to a reference example.

In the reading method according to the reference example, peaks of histograms along designated line segments are detected in an image in which the numeral of the segment display is imaged. Then, the numeral of the segment display is identified based on the numbers and the positions of the peaks. In the reading method, it is difficult to correctly detect the peaks when the boldness (the line width) of the numeral of the segment display is large. The positions of the peaks change according to the font of the numeral and the size of the image. It is difficult to correctly identify the numeral when the positions of the peaks are different from the positions used as the reference.

In the reading system 1 according to the first embodiment, line thinning is performed when reading the character displayed by the segment display. The cluster of pixels representing the character is thinned in the line thinning. Thereby, the width of the cluster of pixels representing the character can be uniform regardless of the boldness of the character of the segment display in the input image. Therefore, the character can be identified with high accuracy regardless of the boldness of the character of the segment display.

In the reading system 1 according to the first embodiment, multiple determination regions are set in the partial image in which the character of the segment display is imaged. The positions of the multiple determination regions are determined based on the size of the partial image. Then, the character of the segment display is identified based on the detection result of the number of pixels of the character in each of the multiple determination regions. By using the detection result of the number of pixels of the character, the character can be identified regardless of the font of the character. Also, by determining the positions of the multiple determination regions based on the size of the partial image, the character can be identified with high accuracy regardless of the size of the partial image.

In the reading system 1 according to the first embodiment, the line thinner 14 is optional. The character can be identified with higher accuracy by combining the line thinning of the line thinner 14 and the setting of the multiple determination regions based on the size of the partial image by the setter 15. The line width of the cluster can be made uniform by thinning the cluster of pixels representing the character. The character can be identified with higher accuracy based on the determination result of the number of pixels regardless of the boldness of the character.

FIGS. 7A to 7D are schematic views illustrating segment displays and setting of determination regions.

The reading system 1 according to the first embodiment is applicable also to segment displays other than a seven-segment display. For example, a character can be read by processing similar to the processing described above for a fourteen-segment display or a sixteen-segment display as well.

Figure 7A:
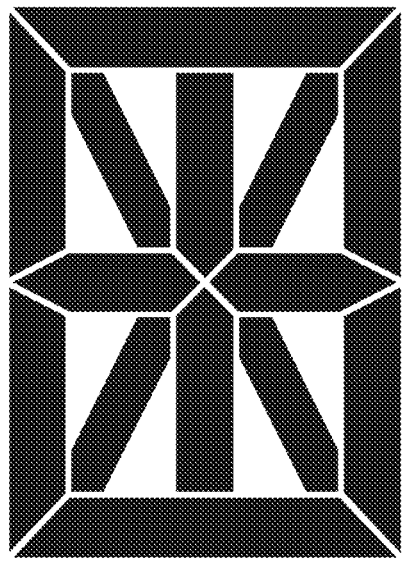
FIGS. 7A to 7D are schematic views illustrating segment displays and setting of determination regions.
Figure 7B:
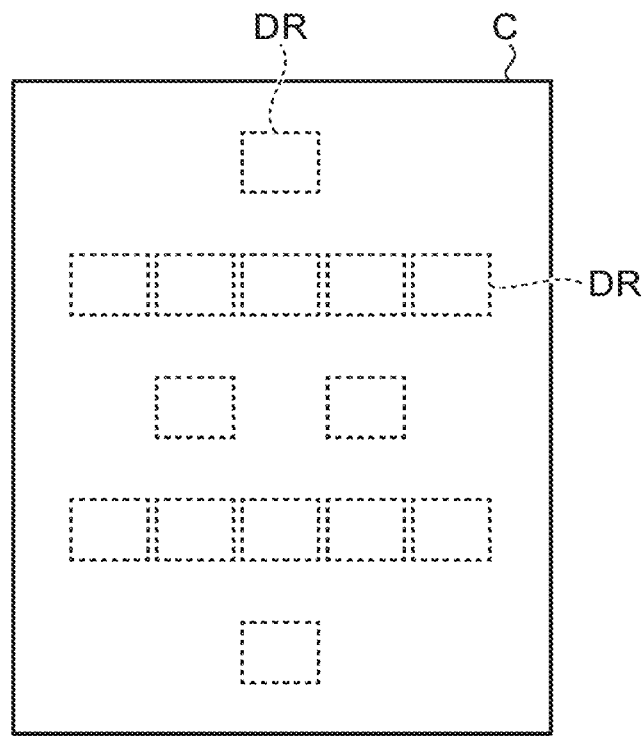

FIG. 7A illustrates an example of a fourteen-segment display. In the fourteen-segment display, one character is displayed by fourteen segments. In such a case, the setter 15 sets fourteen or more determination regions in the partial image. For example, as illustrated in FIG. 7B, the setter 15 sets fourteen determination regions DR in the partial image C. The memory device 20 stores a table of the correspondences between the characters and the determination results of the fourteen regions. The determiner 16a determines whether or not a portion of a character exists in each determination region DR. The comparer 16b refers to the table of the memory device 20 and searches for a numeral corresponding to the determination result. The character that is displayed by the fourteen-segment display is identified thereby.

Figure 7C:
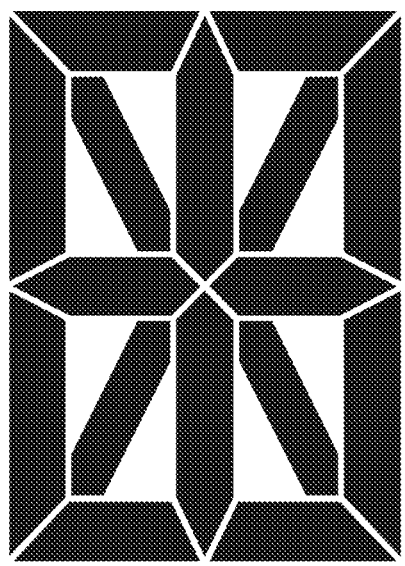
Figure 7D:
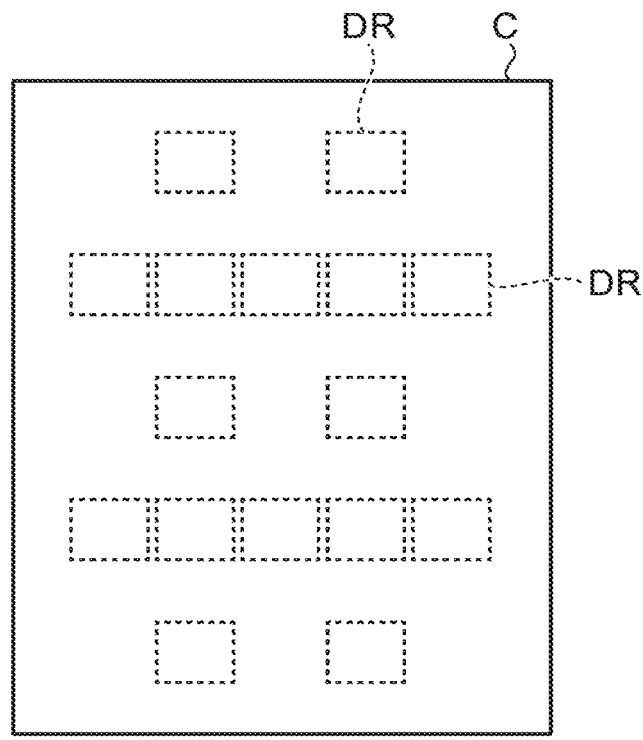

FIG. 7C illustrates an example of a sixteen-segment display. In the sixteen-segment display, one character is displayed by sixteen segments. In such a case, the setter 15 sets sixteen or more determination regions in the partial image. For example, the setter 15 sets sixteen determination regions DR in the partial image C as illustrated in FIG. 7D. Thereafter, the character that is displayed by the sixteen-segment display is identified based on the determination result of the determiner 16a similarly to the example described above.

First Modification

Figure 8:
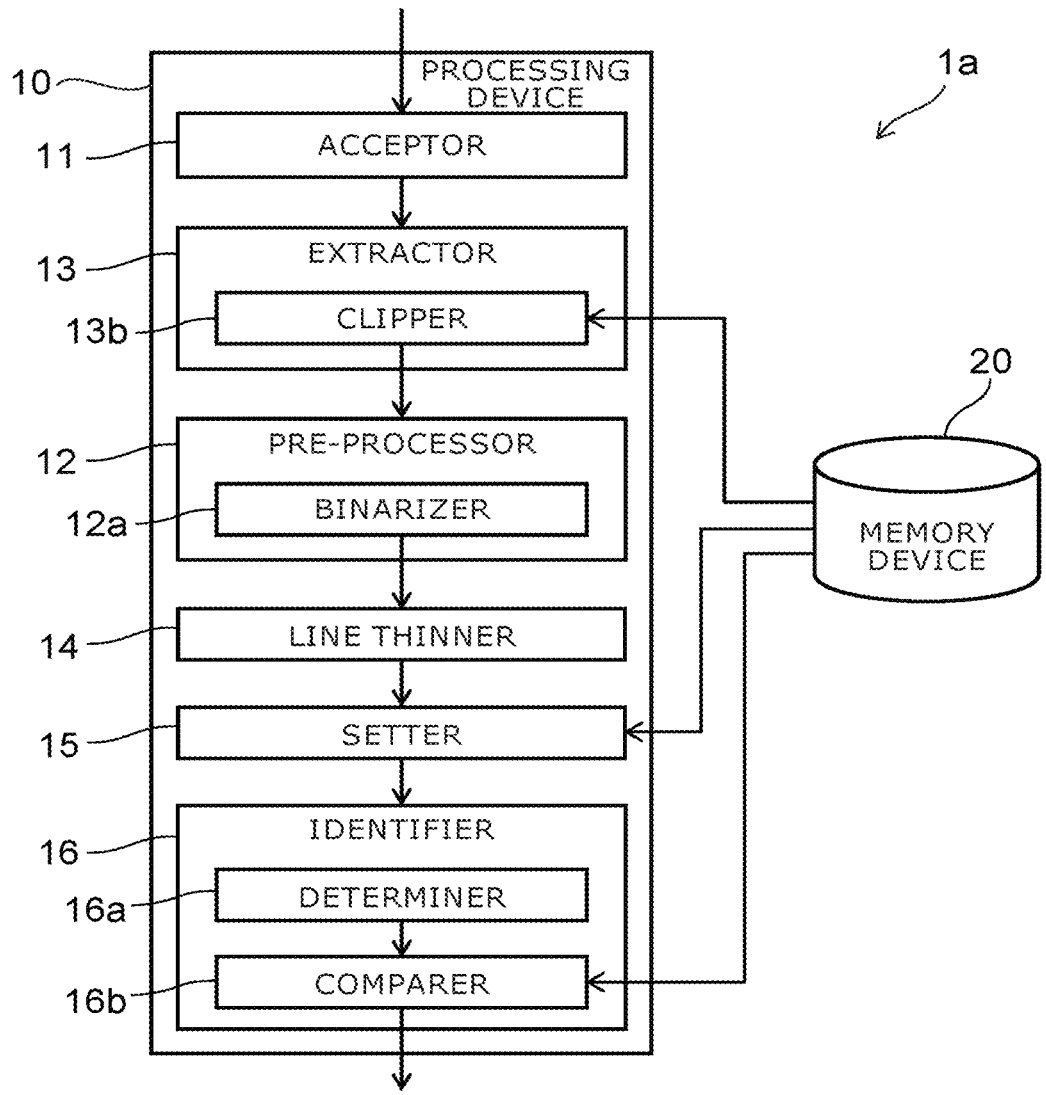
FIG. 8 is a block diagram illustrating a configuration of a reading system according to a first modification of the first embodiment.

FIG. 8 is a block diagram illustrating a configuration of a reading system according to a first modification of the first embodiment.

In the reading system 1a according to the first modification, the cutting out by the extractor 13 is performed before the preprocessing. For example, the cut-out position of the input image is prestored in the memory device 20. The clipper 13b accesses the memory device 20 and refers to the stored cut-out position. The clipper 13b cuts out a portion of the input image at the cut-out position. The extractor 13 transmits, to the pre-processor 12, the cut-out portion of the input image as the partial image.

In the pre-processor 12, the partial image is binarized by the binarizer 12a. The pre-processor 12 transmits the binarized input image to the line thinner 14. Expansion processing and contraction processing of the binarized input image may be performed by the pre-processor 12.

In the reading system 1a according to the first modification as well, the character that is displayed by the segment display can be read with higher accuracy. Labeling processing is unnecessary according to the reading system 1a. If a cluster of white pixels representing one character is divided into two or more clusters when labeling processing is used to extract the partial images, the divided clusters are extracted as partial images. Accordingly, the numeral that is displayed by the segment display is not read correctly. When labeling processing is unnecessary, two or more divided clusters can be extracted as a partial image for identifying one character.

However, when a portion of the input image is cut out at a predetermined cut-out position, there is a possibility that a portion of the character may be cut off, or the character may be small in the partial image. Accordingly, it is desirable to extract the partial image by using labeling processing as illustrated in FIG. 1 to increase the accuracy of the reading.

Second Modification

Figure 9:
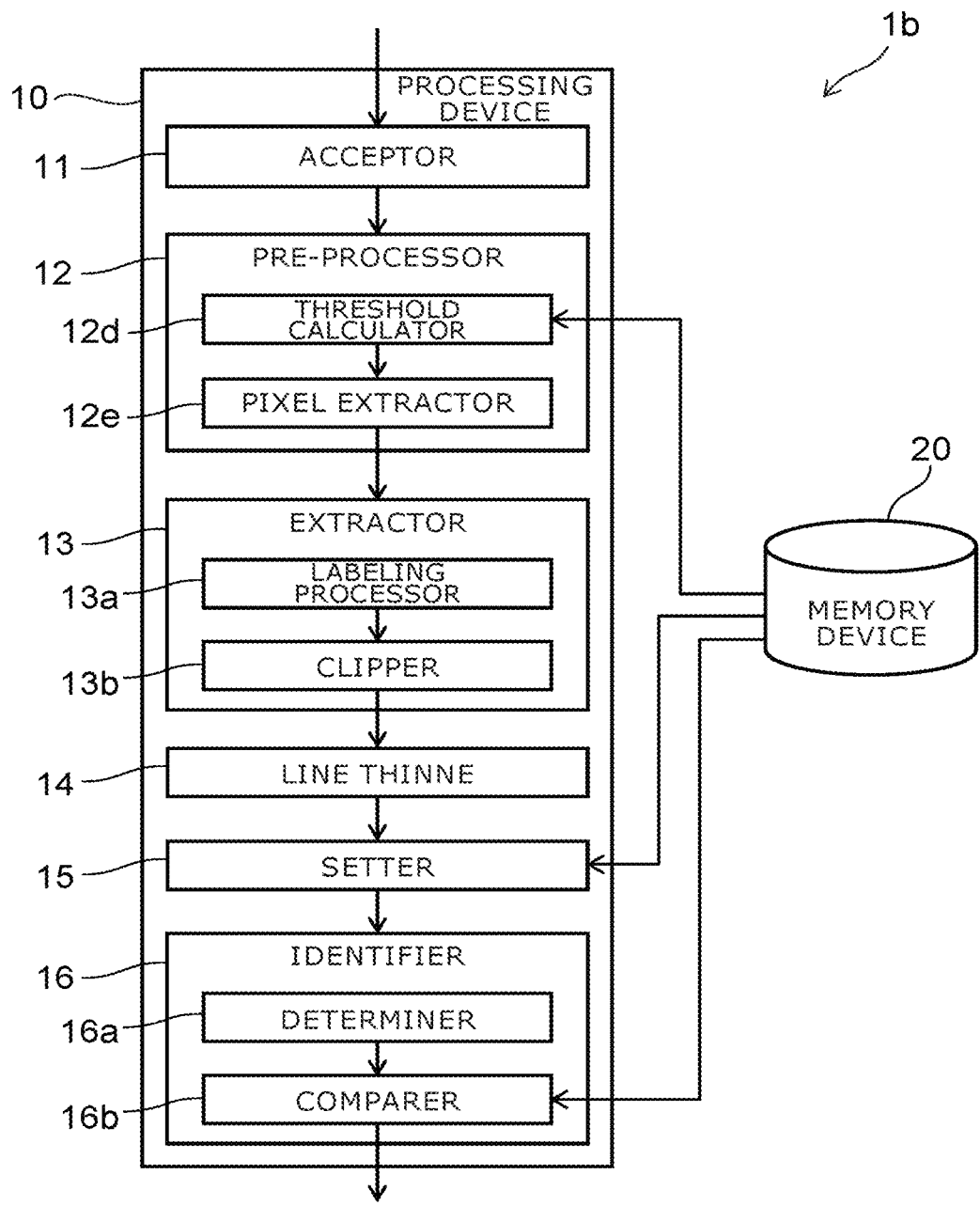
FIG. 9 is a block diagram illustrating a configuration of a reading system according to a second modification of the first embodiment.

FIG. 9 is a block diagram illustrating a configuration of a reading system according to a second modification of the first embodiment.

In the reading system 1b according to the second modification, the pre-processor 12 includes a threshold calculator 12d and a pixel extractor 12e. The threshold calculator 12d calculates thresholds based on the input image. For example, the memory device 20 stores a formula for calculating the thresholds. The threshold calculator 12d accesses the memory device 20 and refers to the formula. The threshold calculator 12d calculates adaptive thresholds. In other words, the threshold calculator 12d calculates a threshold for one pixel by using the formula and the brightness or the luminance of the pixel. The threshold calculator 12d calculates the thresholds of the pixels and transmits the thresholds to the pixel extractor 12e.

The pixel extractor 12e compares the threshold and the brightness or the luminance of the pixel for each pixel included in the input image. For example, the pixel extractor 12e extracts only pixels of which the brightness or the luminance is not less than the threshold. Thereby, for example, only portions of lit segments are extracted. In other words, only pixels that represent a numeral are extracted. For example, the points where the pixels are not extracted are set to black. The pixel extractor 12e transmits the processed input image to the extractor 13.

The extractor 13 and the subsequent components perform processing similar to those of the reading system 1 illustrated in FIG. 1. Or, the extractor 13 of the reading system 1b may perform processing similar to that of the extractor 13 of the reading system 1a illustrated in FIG. 8.

Second Embodiment

Figure 10:
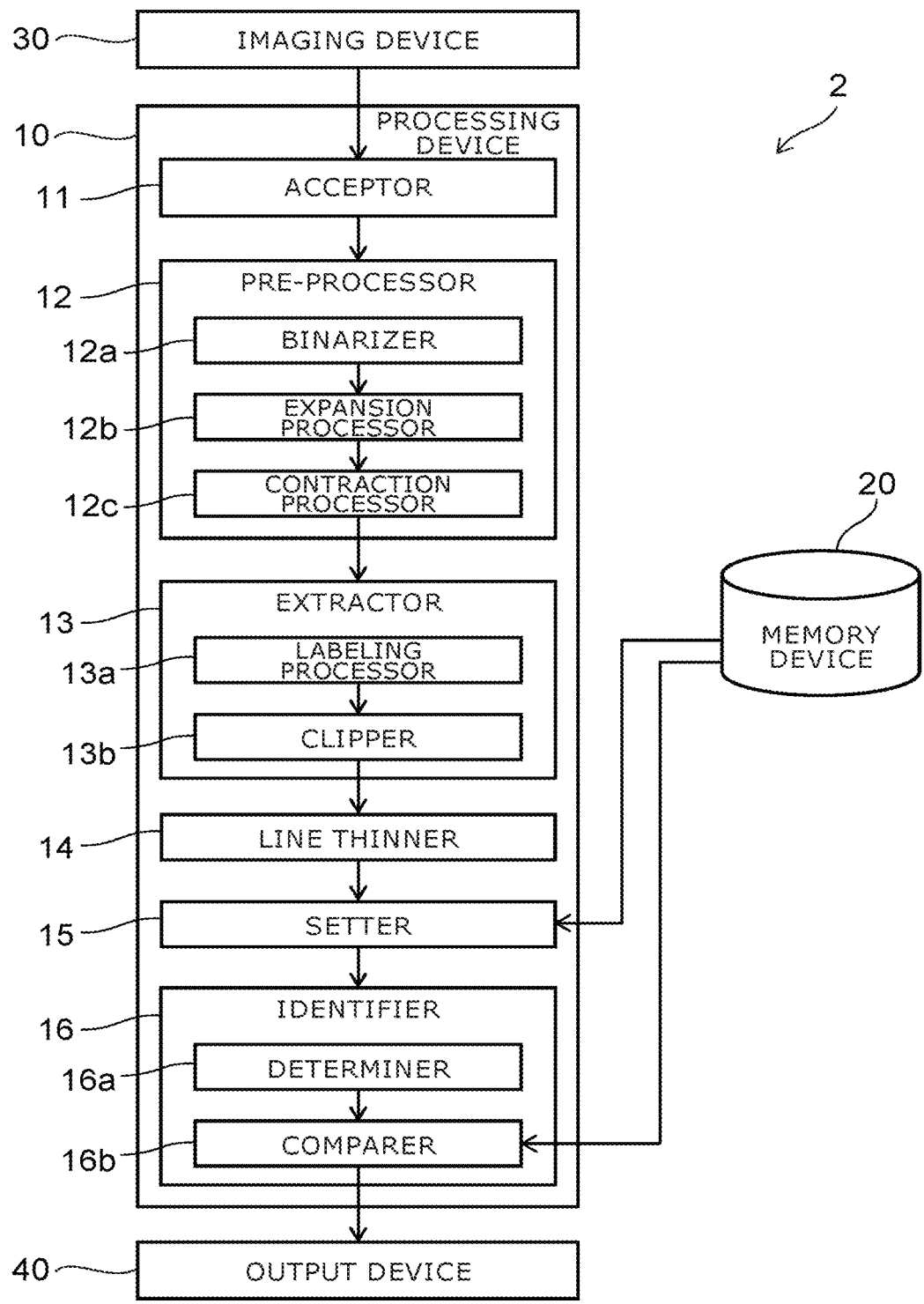
FIG. 10 is a block diagram illustrating a configuration of a reading system according to a second embodiment.

FIG. 10 is a block diagram illustrating a configuration of a reading system according to a second embodiment.

The reading system 2 according to the second embodiment further includes an imaging device 30. The imaging device 30 generates an image by imaging a segment display. The imaging device 30 transmits the generated image to the processing device 10. Or, the imaging device 30 may store the image in the memory device 20. The processing device 10 accesses the memory device 20 and refers to the stored image. When the imaging device 30 acquires a video image, the imaging device 30 fetches a static image from the video image and transmits the static image to the processing device 10. The imaging device 30 includes, for example, a camera.

The processing device 10 transmits, to an output device 40, information based on characters that are identified and read. The output device 40 outputs the information received from the processing device 10 so that a user can recognize the information. The output device 40 includes, for example, at least one of a monitor, a printer, or a speaker.

For example, the processing device 10, the memory device 20, the imaging device 30, and the output device 40 are connected to each other by a wired or wireless technique. Or, these devices may be connected to each other via a network. Or, at least two or more of the processing device 10, the memory device 20, the imaging device 30, or the output device 40 may be embedded in one device. For example, the processing device 10 may be embedded in an integral body with the image processor of the imaging device 30, etc.

Third Embodiment

Figure 11:
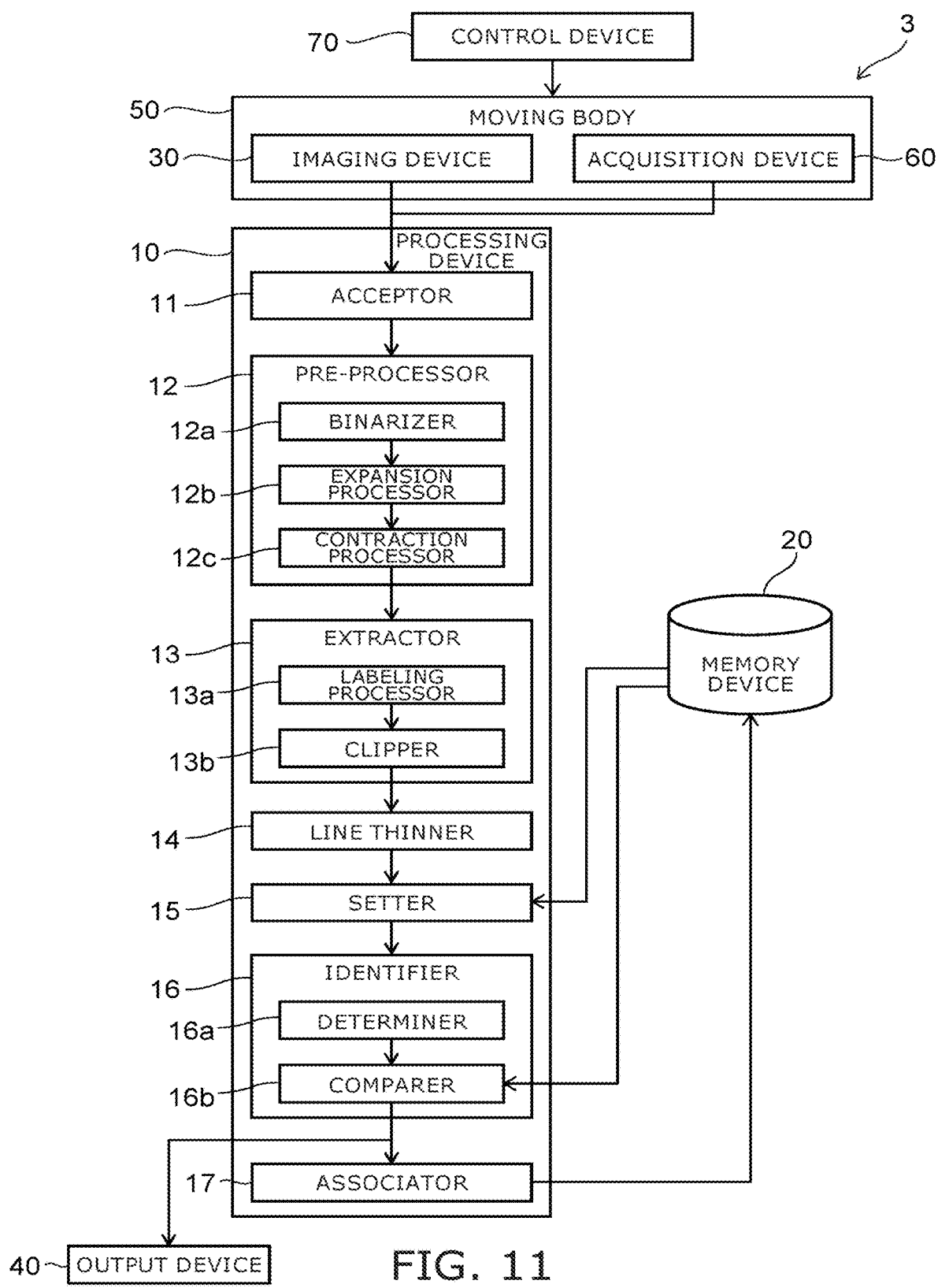
FIG. 11 is a block diagram illustrating a configuration of a reading system according to a third embodiment.

FIG. 11 is a block diagram illustrating a configuration of a reading system according to a third embodiment.

The reading system 3 according to the third embodiment further includes a moving body 50. The moving body 50 moves through a prescribed region. A segment display is provided inside the region through which the moving body 50 moves. The moving body 50 is, for example, an automated guided vehicle (AGV). The moving body 50 may be a flying object such as a drone, etc. The moving body 50 may be an independent walking robot. The moving body 50 may be an unmanned forklift, crane, or the like that performs a prescribed task.

For example, the processing device 10 and the imaging device 30 are mounted to the moving body 50. The processing device 10 may be provided separately from the moving body 50 and may be connected to the moving body 50 via a network. When the moving body 50 moves to a position where the segment display is imageable, the imaging device 30 generates an image by imaging the segment display.

As illustrated in FIG. 11, the reading system 3 may further include an acquisition device 60. The acquisition device 60 is mounted to the moving body 50. For example, an identifier that includes unique identification information corresponding to the segment display is provided. The acquisition device 60 acquires the identification information of the identifier.

As illustrated in FIG. 11, the reading system 3 may further include a control device 70. The control device 70 controls the moving body 50. The moving body 50 moves through the prescribed region based on a command transmitted from the control device 70. The control device 70 may be mounted to the moving body 50 or may be provided separately from the moving body 50. The control device 70 includes, for example, a processing circuit made of a central processing unit. One processing circuit may function as both the processing device 10 and the control device 70.

For example, the identifier is a radio frequency (RF) tag including ID information. The identifier emits an electromagnetic field or a radio wave including the ID information. The acquisition device 60 acquires the ID information by receiving the electromagnetic field or the radio wave emitted from the identifier.

Or, the identifier may be a one-dimensional or two-dimensional barcode. The acquisition device 60 may be a barcode reader. The acquisition device 60 acquires the identification information of the barcode by reading the barcode.

As illustrated in FIG. 11, the processing device 10 may further include an associator 17. For example, when acquiring the identification information, the acquisition device 60 transmits the identification information to the processing device 10. The associator 17 associates the transmitted identification information and the characters that are read and stores the associated information in the memory device 20.

Figure 12:
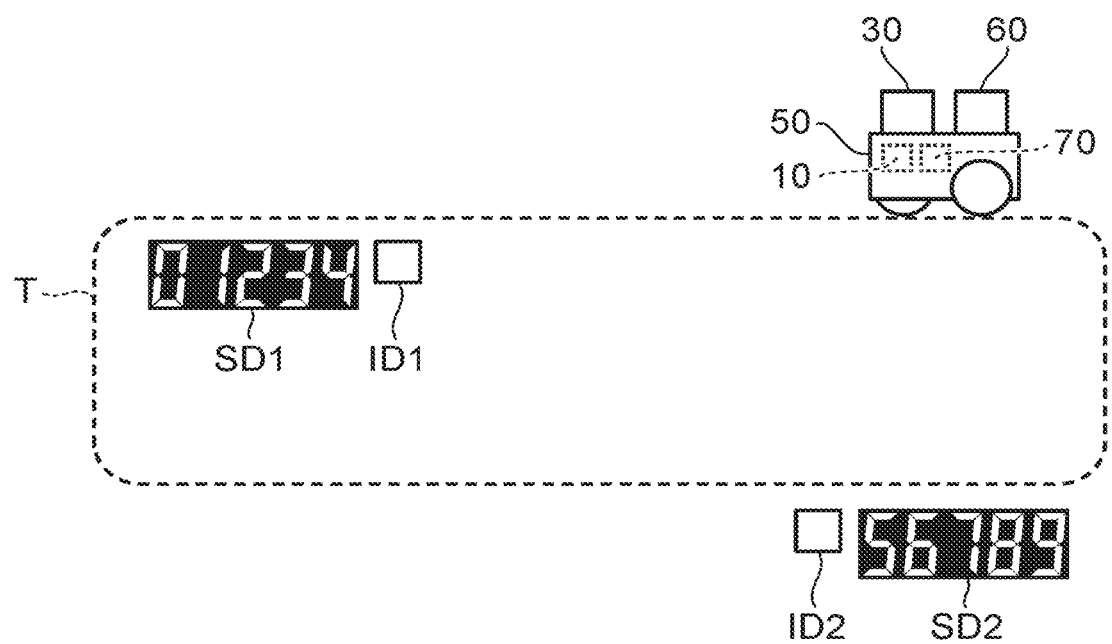
FIG. 12 is a schematic view describing an operation of the reading system according to the third embodiment.

FIG. 12 is a schematic view describing an operation of the reading system according to the third embodiment.

For example, the moving body 50 is a moving body moving along a prescribed trajectory T. The imaging device 30 and the acquisition device 60 are mounted to the moving body 50. The processing device 10 may be mounted to the moving body 50 or may be provided separately from the moving body 50. The trajectory T is provided so that the moving body 50 passes in front of segment displays SD1 and SD2.

For example, the moving body 50 moves along the trajectory T and decelerates or stops when arriving at a position where the segment display SD1 or SD2 is imageable by the imaging device 30. For example, when decelerating or stopping, the moving body 50 transmits an imaging command to the imaging device 30. Or, the imaging command may be transmitted to the imaging device 30 from the control device 70. When receiving the command, the imaging device 30 images the segment display SD1 or SD2 while the moving body 50 has decelerated or stopped.

Or, the moving body 50 moves along the trajectory T at a speed such that the imaging device 30 can image the segment display SD1 or SD2 without blur. When the position where the segment display SD1 or SD2 is imageable by the imaging device 30 is reached, the imaging command is transmitted from the moving body 50 or the control device described above. When receiving the command, the imaging device 30 images the segment display SD1 or SD2. When the image has been generated by imaging, the imaging device 30 transmits the image to the processing device 10 mounted to the moving body 50 or provided separately from the moving body 50.

An identifier ID1 is provided at the segment display SD1 vicinity. An identifier ID2 is provided at the segment display SD2 vicinity. For example, the acquisition device 60 acquires the identification information of the identifier ID1 or ID2 while the moving body 50 has decelerated or stopped.

For example, the moving body 50 moves in front of the segment display SD1. The imaging device 30 generates an image by imaging the segment display SD1. The processing device 10 identifies the characters displayed by the segment display SD1 from the image. The acquisition device 60 acquires the identification information of the identifier ID1 corresponding to the segment display SD1. The processing device 10 associates the identification information and the identified characters.

Or, the acquisition device 60 may acquire the identification information of the identifier initially when the moving body 50 moves in front of the segment display. For example, a command to read the characters of a designated segment display is transmitted to the moving body 50. The command includes information of the position of the segment display. The memory device 20 stores the identification information associated with the positions of the identifiers. The moving body 50 accesses the memory device 20 when the acquisition device 60 acquires the identification information. The moving body 50 refers to the position of the identifier associated with the identification information. The moving body 50 determines whether or not the position of the referred identifier matches the position of the segment display of the command to read the characters. In the case of a match, the moving body 50 uses the imaging device 30 to image the segment display SD1. In other words, in this method, the reading of the identification information functions as an interlock when reading the characters of the segment display.

Figure 13:
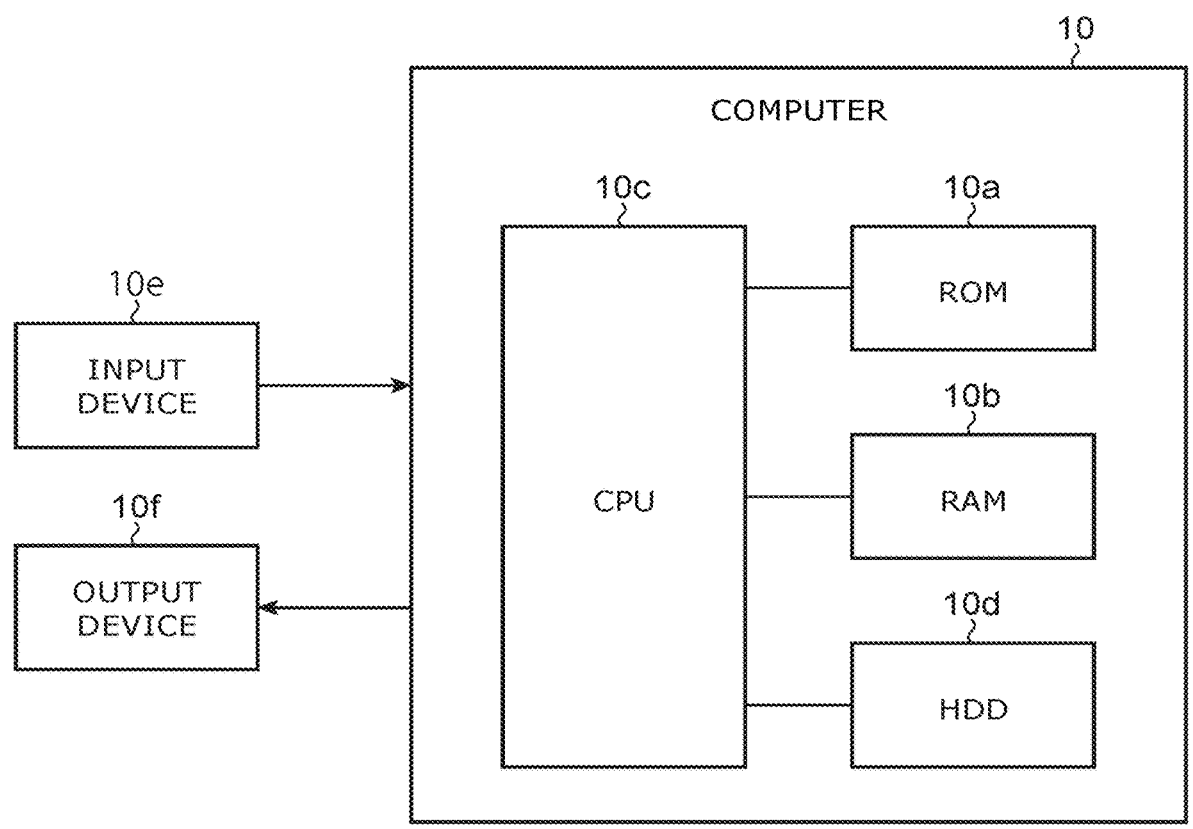
FIG. 13 is a block diagram illustrating a hardware configuration of the reading system according to the embodiments.

FIG. 13 is a block diagram illustrating a hardware configuration of the reading system according to the embodiments.

For example, the processing device 10 of the reading systems 1, 1a, 1b, 2, and 3 is a computer and includes ROM (Read Only Memory) 10a, RAM (Random Access Memory) 10b, a CPU (Central Processing Unit) 10c, and a HDD (Hard Disk Drive) 10d.

The ROM 10a stores programs controlling the operations of the computer. The ROM 10a stores programs necessary for causing the computer to function as the processing device 10.

The RAM 10b functions as a memory region where the programs stored in the ROM 10a are loaded. The CPU 10c includes a processing circuit. The CPU 10c reads a control program stored in the ROM 10a and controls the operation of the computer according to the control program. The CPU 10c loads various data obtained by the operation of the computer into the RAM 10b. The HDD 10d stores information necessary for reading and information obtained in the reading process. For example, the HDD 10d functions as the memory device 20 illustrated in FIG. 1.

Instead of the HDD 10d, the processing device 10 may include an eMMC (embedded Multi Media Card), a SSD (Solid State Drive), a SSHD (Solid State Hybrid Drive), etc.

An input device 10e and an output device 10f may be connected to the processing device 10. The user uses the input device 10e to input information to the processing device 10. The input device 10e includes at least one of a mouse, a keyboard, a microphone (audio input), or a touchpad. Information that is transmitted from the processing device 10 is output to the output device 10f. The output device 10f includes at least one of a monitor, a speaker, a printer, or a projector. A device such as a touch panel that functions as both the input device 10e and the output device 10f may be used.

A hardware configuration similar to FIG. 13 is applicable also to the control device 70 of the reading system 3. Or, one computer may function as the processing device 10 and the control device 70 in the reading system 3. The processing and the functions of the processing device 10 and the control device 70 may be realized by collaboration between more computers.

The embodiments may include the following configurations.

Configuration 1
 A reading system, comprising:
  a processing device including
   an extractor extracting a partial image from an input image, a character of a segment display being imaged in the partial image, the segment display including a plurality of segments,
   a setter setting, in the partial image, a plurality of determination regions corresponding respectively to the plurality of segments, positions of the plurality of determination regions being determined based on a size of the partial image, and
   an identifier determining a number of pixels of a character for each of the plurality of determination regions and identifying the character based on a determination result.

Configuration 2
 The reading system according to Configuration 1, wherein
  the processing device further includes a pre-processor performing at least preprocessing of the input image,
  the preprocessing includes binary processing of binarizing the input image into a first color and a second color, and
  the extractor extracts, from the preprocessed input image, a portion including a cluster of pixels of the first color as the partial image.

Configuration 3
 The reading system according to Configuration 2, wherein
  the preprocessing further includes:
   processing in which a pixel adjacent to a pixel of the first color is modified into the first color in the input image; and
   processing in which a pixel adjacent to a pixel of the second color is modified into the second color in the input image.

Configuration 4
 The reading system according to any one of Configurations 1 to 3, wherein
  the extractor extracts the partial image that is a rectangle made of a plurality of pixels arranged in a first direction and in a second direction crossing the first direction, and
  the setter sets a portion of the plurality of determination regions to be arranged along the first direction and sets an other portion of the plurality of determination regions to be arranged along the second direction.

Configuration 5
 The reading system according to Configuration 4, wherein
  a number of the plurality of determination regions is equal to a number of segments used to display one character in the segment display.

Configuration 6
 The reading system according to any one of Configurations 1 to 5, further comprising:
  an imaging device generating the input image by imaging the segment display.

Configuration 7
 The reading system according to any one of Configurations 1 to 6, wherein
  the imaging device images a video image and cuts out, from the video image, the input image in which the segment display is imaged.

Configuration 8
 The reading system according to Configuration 6 or 7, further comprising a moving body moving through a prescribed region and having the imaging device mounted to the moving body.

Configuration 9
 The reading system according to Configuration 8, wherein
  the moving body is an automated guided apparatus, a drone, or a robot.

Configuration 10
 The reading system according to Configuration 8 or 9, wherein
  the moving body decelerates or stops at a position where the segment display is imageable by the imaging device, and
  the imaging device images the segment display while the moving body has decelerated or stopped.

Configuration 11
 The reading system according to any one of Configurations 1 to 6, further comprising:
  an acquirer acquiring identification information from an identifier including the identification information, the acquirer transmitting the identification information to the processing device, the identification information being unique,
  the processing device further including an associator associating the identification information and the identified character.

Configuration 12

The reading system according to Configuration 11, further comprising:
a moving body moving through a prescribed region in which the segment display and the identifier are provided, and having the acquisition device mounted to the moving body.

Configuration 13

The reading system according to any one of Configurations 1 to 12, further comprising:
an output device,
the processing device transmitting, to the output device, information based on the identified and read character,
the output device outputting the information.

Configuration 14

A reading method, comprising:
extracting a partial image from an input image, a character of a segment display being imaged in the partial image, the segment display including a plurality of segments;
setting, in the partial image, a plurality of determination regions corresponding respectively to the plurality of segments, positions of the plurality of determination regions being determined based on a size of the partial image; and
determining a number of pixels of a character for each of the plurality of determination regions, and identifying the character based on a determination result.

Configuration 15

The reading method according to Configuration 14, further comprising:
causing a moving body to which an imaging device is mounted to move inside a region where the segment display is provided; and
acquiring the input image by the imaging device imaging the segment display.

Configuration 16

A storage medium storing a program causing a processing device to:
extract a partial image from an input image, a character of a segment display being imaged in the partial image, the segment display including a plurality of segments;
set, in the partial image, a plurality of determination regions corresponding respectively to the plurality of segments, positions of the plurality of determination regions being determined based on a size of the partial image; and
determine a number of pixels of a character for each of the plurality of determination regions, and identify the character based on a determination result.

Configuration 17

A moving body moving through a prescribed region where a segment display including a plurality of segments is provided, the moving body having an imaging device mounted to the moving body, the moving body comprising:
a processing device receiving an input of an image of the segment display imaged by the imaging device,
the processing device including
an extractor extracting a partial image from the input image, a character of the segment display being imaged in the partial image, the segment display including a plurality of segments,
a setter setting, in the partial image, a plurality of determination regions corresponding respectively to the plurality of segments, positions of the plurality of determination regions being determined based on a size of the partial image, and
an identifier determining a number of pixels of a character for each of the plurality of determination regions, and identifying the character based on a determination result.

Configuration 18

The moving body according to Configuration 17, further comprising:
a control device controlling the moving body and the imaging device,
the control device causing the imaging device to image the segment display when the moving body moves to a position where the segment display is imageable by the imaging device.

By using the reading system, the reading method, and the moving body according to the embodiments described above, the numerals displayed by the segment display can be read with higher accuracy. Similarly, by using a program for causing a computer to operate as the reading system, the numerals displayed by the segment display can be read by the computer with higher accuracy.

For example, the processing of the various data recited above is executed based on a program (software). For example, the processing of the various information recited above is performed by a computer storing the program and reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The acquisition (or the reading) of the program by the computer may be performed via a network.

The processing device and the control device according to the embodiments include one or multiple devices (e.g., personal computers, etc.). The processing device and the control device according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:
1. A reading system, comprising:
a processing device including:
an acceptor accepting an image in which a segment display is imaged, the segment display including a plurality of segments, a numeral being displayed by at least part of the plurality of segments;

a pre-processor performing at least preprocessing of the image, the preprocessing including binary processing of binarizing the image into a first color and a second color;

an extractor assigning a value to a cluster of pixels of the first color in the binarized image and extracting a partial image from the preprocessed image by cutting out the cluster, the cluster in the partial image representing the numeral, wherein the partial image is a rectangle made of a plurality of pixels arranged in a first direction and in a second direction crossing the first direction;

a line thinner thinning the cluster of pixels representing the numeral in the partial image;

a setter setting, in the partial image, a plurality of determination regions corresponding respectively to the plurality of segments, wherein the setter sets a first portion of the plurality of determination regions to be arranged along the first direction, and sets a second portion of the plurality of determination regions to be arranged along the second direction, wherein a number of the plurality of determination regions is equal to a number of the segments used to display any single numeral in the segment display; and an identifier detecting a number of pixels included in the thinned cluster for each of the plurality of determination regions, and identifying the numeral based on a detection result.

2. The system according to claim 1, wherein
the setter determines positions of the plurality of determination regions based on a size of the partial image.

3. The system according to claim 1, wherein
the preprocessing further includes:
processing in which a pixel adjacent to a pixel of the first color is modified into the first color in the image; and
processing in which a pixel adjacent to a pixel of the second color is modified into the second color in the image.

4. The system according to claim 1, further comprising:
an imaging device generating the image by imaging the segment display.

5. The system according to claim 4, wherein
the imaging device images a video image and fetches, from the video image, the image in which the segment display is imaged.

6. The system according to claim 5, further comprising:
a moving body moving through a prescribed region and having the imaging device mounted to the moving body.

7. The system according to claim 6, wherein
the moving body is an automated guided apparatus, a drone, or a robot.

8. The system according to claim 6, wherein
the moving body decelerates or stops at a position where the segment display is imageable by the imaging device, and
the imaging device images the segment display while the moving body has decelerated or stopped.

9. The system according to claim 1, further comprising:
an acquirer acquiring identification information from an identifier including the identification information, the acquirer transmitting the identification information to the processing device, the identification information being unique, the processing device further including an associator associating the identification information and the identified numeral.

10. The system according to claim 9, further comprising:
a moving body moving through a prescribed region in which the segment display and the identifier are provided, and having the acquisition device mounted to the moving body.

11. The system according to claim 1, further comprising:
an output device,
the processing device transmitting, to the output device, information based on the identified and read numeral,
the output device outputting the information.

12. The system according to claim 1, wherein in a case where a plurality of clusters is included in the binarized image, the extractor respectively assigns a plurality of values to the plurality of clusters, the plurality of values being different from each other.

13. The system according to claim 1, wherein the number of the plurality of determination regions is seven.

14. The system according to claim 1, wherein a number of determination regions of the first portion of the plurality of determination regions less than a number of determination regions of the second portion of the plurality of determination regions.

15. The system according to claim 14, wherein the number of the determination regions of the first portion of the plurality of determination regions is three, and the number of the determination regions of the second portion of the plurality of determination regions is four.

16. A reading method, comprising:
accepting an image in which a segment display is imaged, the segment display including a plurality of segments, a numeral being displayed by at least part of the plurality of segments;
preprocessing of the image, the preprocessing including binary processing of binarizing the image into a first color and a second color;
assigning a value to a cluster of pixels of the first color in the binarized image, the cluster representing the numeral;
extracting a partial image from the preprocessed image by cutting out the cluster, wherein the partial image is a rectangle made of a plurality of pixels arranged in a first direction and in a second direction crossing the first direction;
thinning the cluster of pixels representing the numeral in the partial image;
setting, in the partial image, the plurality of determination regions corresponding respectively to the plurality of segments, wherein a first portion of the plurality of determination regions is set to be arranged along the first direction, and a second portion of the plurality of determination regions is set to be arranged along the second direction, wherein a number of the plurality of determination regions is equal to a number of the segments used to display any single numeral in the segment display; and
determining a number of pixels included in the thinned cluster for each of the plurality of determination regions, and identifying the numeral based on a determination result.

17. The method according to claim 16, wherein
positions of the plurality of determination regions are determined based on a size of the partial image.

18. The method according to claim 16, further comprising:
    causing a moving body to which an imaging device is mounted to move inside a region where the segment display is provided; and
    acquiring the image by the imaging device imaging the segment display.

19. The method according to claim 16, wherein in a case where a plurality of clusters is included in the binarized image, a plurality of values is respectively assigned to the plurality of clusters, the plurality of values being different from each other.

20. A non-transitory computer-readable storage medium storing a program causing a processing device to:
    accept an image in which a segment display is imaged, the segment display including a plurality of segments, a numeral being displayed by at least part of the plurality of segments;
    preprocess the image, the preprocess including binary processing of binarizing the image into a first color and a second color;
    assign a value to a cluster of pixels of the first color in the binarized image, the cluster representing the numeral;
    extract a partial image from the preprocessed image by cutting out the cluster, wherein the partial image is a rectangle made of a plurality of pixels arranged in a first direction and in a second direction crossing the first direction;
    thin the cluster of pixels representing the numeral in the partial image;
    set, in the partial image, a plurality of determination regions corresponding respectively to the plurality of segments, wherein a first portion of the plurality of determination regions is set to be arranged along the first direction, and a second portion of the plurality of determination regions is set to be arranged along the second direction, wherein a number of the plurality of determination regions is equal to a number of the segments used to display any single numeral in the segment display; and
    determine a number of pixels included in the thinned cluster for each of the plurality of determination regions, and identify the numeral based on a determination result.

21. The storage medium according to claim 20, wherein the program causes the processing device to determine positions of the plurality of determination regions based on a size of the partial image.

22. The storage medium according to claim 20, wherein in a case where a plurality of clusters is included in the binarized image, the program causes the processing device to respectively assign a plurality of values to the plurality of clusters, the plurality of values being different from each other.

23. A mechanical moving body moving through a prescribed region where a segment display including a plurality of segments is provided, the segment display including a plurality of segments, a numeral being displayed by at least part of the plurality of segments, the moving body having an imaging device mounted to the moving body, the moving body comprising:
    a processing device receiving an image of the segment display imaged by the imaging device,
    the processing device including:
        a pre-processor performing at least preprocessing of the input image, the preprocessing including binary processing of binarizing the input image into a first color and a second color;
        an extractor assigning a value to a cluster of pixels of the first color in the binarized image and extracting a partial image from the preprocessed image by cutting out the cluster, the cluster in the partial image representing the numeral, wherein the partial image is a rectangle made of a plurality of pixels arranged in a first direction and in a second direction crossing the first direction;
        a line thinner thinning the cluster of pixels representing the numeral in the partial image;
        a setter setting, in the partial image, a plurality of determination regions corresponding respectively to the plurality of segments, wherein the setter sets a first portion of the plurality of determination regions to be arranged along the first direction, and sets a second portion of the plurality of determination regions to be arranged along the second direction, wherein a number of the plurality of determination regions is equal to a number of the segments used to display any single numeral in the segment display; and
        an identifier detecting a number of pixels included in the thinned cluster for each of the plurality of determination regions, and identifying the numeral based on a detection result.

24. The mechanical moving body according to claim 23, further comprising:
    a control device controlling the moving body and the imaging device,
    the control device causing the imaging device to image the segment display when the moving body moves to a position where the segment display is imageable by the imaging device.

25. The mechanical moving body according to claim 23, wherein
    the imaging device images a video image and fetches, from the video image, the image in which the segment display is imaged.

* * * * *